United States Patent Office 2,772,952
Patented Dec. 4, 1956

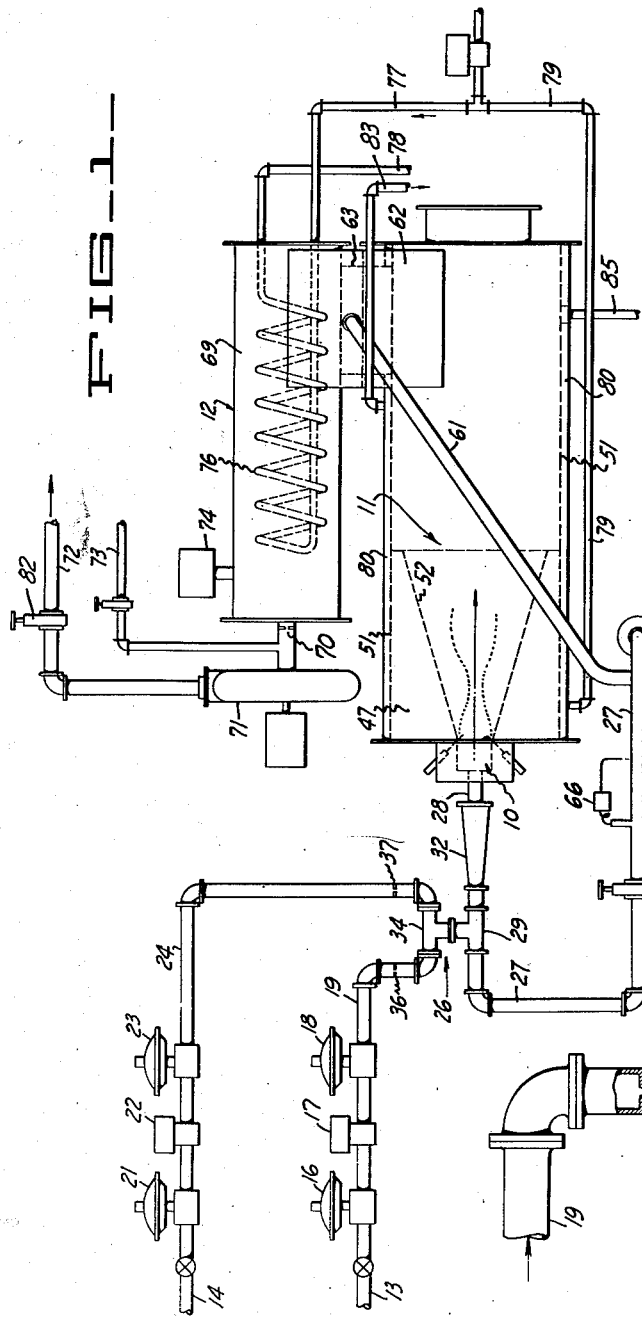

2,772,952
GAS GENERATOR AND METHOD
John H. Jacobs, Oakland, Calif.
Application January 12, 1952, Serial No. 266,182
1 Claim. (Cl. 23—281)

This invention relates generally to apparatus and methods for the generation of special treatment gas.

In the treatment of food products it has been found desirable to contact them with a gaseous atmosphere generated by the controlled burning of fuel gas. The fuel gas employed may be natural gas or a liquefied petroleum product such as butane or propane. As disclosed particularly in Dunkley Patent No. 2,490,951, the controlled burning of such a gas with an amount of combustion supporting air which is substantially less than that required for complete combustion, provides gaseous products of combustion which are effective to inhibit food spoilage. The present process provides a generator and a gas generating method which is particularly effective to produce gaseous products of combustion suitable for use with the Dunkley process, or for other possible applications.

In connection with the above mentioned Dunkley process, it has been found that effectiveness of the gas in preserving food products is enhanced by generating the gas with an amount of combustion supporting air which is substantially less than that theoretically required for complete combustion, in such a manner that the oxygen content is zero or substantially zero. The presence of oxygen tends to cause undesired oxidation of the material being treated, and furthermore the presence of residual oxygen as a result of combustion has been found to destroy or inhibit certain desired active components of the gas which greatly enhance effectiveness in the Dunkley process.

Aside from the Dunkley process there are other industrial applications where it is desired to generate a gas of zero oxygen content. For example references can be made to gases suitable for use in the treatment of metals, for enveloping electrical welding operations, or as a noncombustible gaseous vehicle in the handling or treatment of finely divided combustible material.

In general it is an object of the present invention to provide a gas generator and method capable of generating a gas having zero oxygen content, by the controlled burning of a fuel gas.

Another object of the invention is to provide a gas generator and method which makes possible controlled burning of fuel gas with an amount of combustion-supporting air which is insufficient for complete combustion, and with the oxygen content of the products of combustion being zero.

Another object of the invention is to provide a gas generating apparatus and method which makes possible relatively compact equipment which can be operated with automatic control to produce gas as may be required for treatment or dehydration of food products, or for other purposes to which it may be applicable.

A further object of the invention is to provide a gas generator and method which is subject to control in order to provide a gas having the characteristics desired.

Referring to the drawing:

Figure 1 is a schematic view illustrating my generator equipment which is used for carrying out the present method.

Figure 2 is a detail in section showing the preferred fuel burner and associated parts.

The generator equipment illustrated in the drawing consists generally of a fuel burner 10 which is associated with the combustion chamber 11. Adjacent the combustion chamber there is a heat exchanger or cooler 12, through which generated gas is caused to pass for chilling the same to a temperature suitable for further handling.

Piping connections are illustrated for making connection with one or more suitable sources of fuel gas. The pipe 13 is shown for making connection with a source of natural gas under pressure, such as a natural gas supply main, and pipe 14 makes connection to a source of liquefied petroleum gas, such as a flask or tank containing propane or butane. One or more pressure reducing regulators 16 and 18 are shown connected to pipe 13 in order to supply the gas to the piping 19 at a desired constant reduced pressure. Suitable flow control means, such as a solenoid controlled valve 17, can be interposed between these regulators or at some convenient point in the line, to permit controlling the gas flow from a remote point. Regulators 21 and 23, together with another solenoid valve 22, similarly connect with pipe 14 for supplying gas at a constant reduced pressure to the pipe 24. Pipe 13 can connect to a source of liquefied petroleum gas, such as butane or propane, and gas from this source may be used when it is not desired or convenient to employ natural gas.

Pipes 19 and 24 connect to the special fuel gas and air mixing and proportioning device 26, a suitable construction for this device being illustrated in Figure 2. Device 26 also connects with the air supply pipe 27, and with the pipe 28 which connects to the burner head 10. The mixing device is arranged to receive either natural or liquefied petroleum gas, and to mix the same with air for subsequent combustion.

Device 26 consists of a T fitting 29, which is provided with the inner restricted nozzle 31. This nozzle is in communication with the discharge end of pipe 27, whereby the supplied air is jetted from the nozzle 31 into the divergent mixing chamber 32. The branch 33 of the T 29 connects with a similar branch of the T fitting 34. The pipes 19 and 24 connect with the respective legs of the T 34, and adjacent this T both of the supply pipes are provided with the flow restricting orifices 36 and 37.

With the proportioning and mixing device described above, fuel gas supplied to either the orifice 36 or 37 is delivered to the T 29, and is aspirated by the air jetting from the nozzle 31, whereby a turbulent mixture of air and fuel gas is discharged into the divergent mixing chamber 32. From thence the mixture passes through pipe 28 to the burner head 10.

The burner head 10 is provided with means for propagating a plurality of flame segments, which merge together to form one general flame mass. The head as illustrated in Figure 2 consists of a shell or casing 41, which is cylindrical in section, and which provides an inner chamber 42 in communication with pipe 28. The forward wall 43 of the head is set inwardly with respect to the front edge 44 of the casing, and is provided with a plurality of spaced openings 46 which are distributed over the entire area of the wall 43.

The entire head is shown enclosed in a refractory material 49, which can be constructed as a liner for the metal wall 51 of the combustion chamber. As illustrated, the refractory liner in front of the burner head is preferably provided with a conical or divergent opening 52, which surrounds the flame mass, and which confines the flame to a desirable conical shape while at the same time increasing the temperature in the conical combustion zone to thereby complete combustion of the mixture.

Means are provided for supplying air to the pipe 27 at a constant temperature, and this temperature is preferably well above average room or atmospheric temperature. Thus a centrifugal blower or pump 56 has its discharge side connected to the pipe 27, and its inlet side connected to the proportioning and mixing valve 57. This valve has one passage connected to pipe 58 and to the atmosphere through the air filter or screen 59. Another inlet passage of valve 57 connects with pipe 61, which communicates with the interior of a metal casing 62. Casing or jacket 62 surrounds the metal duct 63 which conveys hot gas from the combustion chamber to the heat exchanger 12. At one point the casing 62 is in communication with the atmosphere through a suitable air filter. By means of this casing or jacket, air is supplied to the valve 57 through pipe 61 at a temperature well above atmospheric. By way of example, the air flow through pipe 61 can be at a temperature of the order of 150° F., and can be mixed with atmospheric air drawn through pipe 57, at a temperature of say 85° F. to provide a resulting temperature of 110° F. Valve 57 is provided with a valve member movable by motive means 64 to a position in which it proportions the flow through pipes 61 and 58, to the intake of the blower 56. Motive means 64 is schematically shown as operatively connected to the controlling temperature responsive means 66, which is in heat conductive relation to the gas flow through the pipe 27. Thus when a change tends to occur in the temperature of gas flowing through pipe 27, such change causes the device 64 to change the setting of the valve member of valve 57, with the result that a compensating change is made in the proportional rate of flow through pipes 61 and 58 to the blower 56. By the means just described the temperature of the gas flowing through pipe 27 can be maintained substantially constant, and at a value above maximum atmospheric temperature, as for example a temperature of the order of 110° F.

The heat exchanger or cooler 12 is shown including the casing 69, which receives the flow of gas from the combustion chamber 11. A blower 71 has its intake connected to the casing 69, preferably through the flow restricting orifice 70, and serves to deliver gas to the discharge pipe 72 which may deliver the gas directly to equipment for utilization of the same. The intake side of the pump of blower 71 is shown connected with the pipe 73, whereby gas may be delivered directly to suitable tanks or other storage devices. A throttling valve or orifice 82 is preferably inserted in the pipe line 72, whereby the discharge head from the blower 71 can be adjusted to correspondingly adjust flow through the orifice 86. Preferably the adjustment is such that a pressure slightly above atmospheric is maintained in the cooler 12.

Casing 69 of the cooler is also preferably connected with a suitable pressure relief valve 74, which is normally set to bleed or vent a small quantity of gas to the atmosphere.

The orifice 86 effectively positions the point where the static pressure of the system changes from slightly above atmospheric (i. e. positive pressure), to a subatmospheric (i. e. negative) pressure. Maintenance of a pressure slightly above atmospheric in the cooler, and also in the combustion chamber, is desirable in that it avoids the possibility of atmospheric air leaking into the system to contaminate the generated gas.

Within the casing 69 there is a heat exchange element which can be in the form of a coiled metal tubing 76. One end of this tubing is connected to water supply piping 77, and the other end to the water discharge pipe 78. Another pipe 79 serves to supply cooling water to the outer jacket wall 80 of the combustion chamber 11. Pipe 83, which communicates with the wall jacket, discharges the cooling water to waste.

For reasons which will presently appear it is desirable for the cooler 12 to be located above the combustion chamber, and for the connecting duct 63 to extend vertically.

Operation of the equipment described above is as follows: Fuel gas is supplied through either one of the pipes 13 or 14. Assuming that natural gas (as distributed in the San Francisco Bay Region) is supplied through pipe 13, pressure reducing regulators 16 and 18 are adjusted to supply a predetermined reduced pressure to the pipe 19. The gas flows through the metering orifice 36 of the proportioning and mixing device 26. Air at a constant temperature and pressure is supplied to the pipe 27 by the blower 56, and is jetted from the nozzle 31 into the mixing chamber 32. Jetting of air through nozzle 31 causes the fuel gas to be mixed with the same, and this mixture flows through chamber 32. A homogeneous combustible mixture is thus supplied through pipe 28 to the burner head 10, to propagate a flame 81 in the combustion chamber. By virtue of the plurality of distributed openings 46, a plurality of flame segments 80 are formed immediately in front of the wall 43, and in the proximity of the forward end of the burner head. These flame segments merge together to form the general flame mass 81.

In normal operation the refractory material is maintained at a relatively high temperature, as for example a temperature above 1000° F. By virtue of its conductive relation with the refractory material, the burner head is likewise maintained at a relatively high temperature, as for example a temperature above 600° F.

The gaseous products of combustion flow past the refractory material and through the water cooled portion of the combustion chamber, where they are immediately cooled to a temperature of the order of 1000° F. As the gases flow through the heat exchanger 12 they are further cooled to a temperature of the order of 80° F., at which temperature they are delivered by a blower 71 to a storage tank or to equipment utilizing the same.

With the heat exchanger 12 being positioned above the combustion chamber, and the connecting conduit 63 extending vertically, I have observed that a continuous rain of condensate appears to take place downwardly through the conduit 63 into the adjacent portion of the combustion chamber. This rain of condensate appears to be produced by chilling the gas in the cooler, and is believed to play a material part in rapid cooling of the gas. A substantial amount of sensible heat from the generated gas is transferred to the condensate, which in part is revaporized. Condensate which is not revaporized collects at the bottom of the chamber and is removed by suitable means, such as the barometric leg 85.

In order to generate the gas desired for the Dunkley process, the proportioning of the combustion-supporting air to the fuel gas supplied to the burner head is substantially less than that required for complete combustion. In a typical instance the amount of air supplied is about 70 to 80% of that theoretically required for complete combustion. If such a combustion-supporting mixture is supplied to the burner of an ordinary gas generator, without utilizing the present method, the oxygen content of the gaseous products of combustion will be of the order of 0.1% or more, and while the gas produced is usable in the Dunkley process, it does not have the high activity produced by use of the present method. By use of my method and apparatus, the oxygen content of the generated gas is reduced to zero, or to such a value that it is difficult if not impossible to detect free oxygen. The gas generated in this manner contains a relatively high carbon monoxide content, together with other active gaseous ingredients. It also contains relatively inactive gases such as nitrogen and carbon dioxide. I attribute the results just described to the fact that the combustion conditions are maintained in such a fashion as to make complete utilization of the oxygen content of the air supply. In my method the proportioning between the weight of fuel gas and the combustion-supporting air is maintained constant, and is not subject to rapid fluctuations, or to changes which may occur more slowly, due for example to a change in the temperature of air supply. I have found that rapid fluctuations in the mixture ratio, as well as fluctuations which may occur more slowly, tend to affect the combustion in such a manner that the free oxygen content of the gaseous products of combustion is increased. In this connection it will be appreciated that when it is desired to produce zero oxygen content, factors which normally would be considered of no importance become substantial or dominant factors in affecting the final results. In addition to maintenance of a fixed ratio between the fuel gas and the combustion-supporting air, the mixture is first burned in flame segments propagated in front of the burner wall 43, to which the segments merge to form a single flame mass. This has likewise been found to be important to maintain the oxygen content zero. Maintenance of the burner head relatively hot, i. e., at a temperature of about 600° F. or higher is also desirable in that it insures commencement of the flame segment at the surface of wall 43, without a spacing from which free oxygen might escape. It is also desirable to have the entire system operating under a relatively low positive pressure slightly above atmospheric, in order to prevent possible contamination from the surrounding atmosphere, as previously explained.

In various industrial applications other than the Dunkley process, the proportioning of the combustion-supporting air to the fuel gas employed may be varied over a relatively wide range as desired. Thus by increasing the amount of combustion-supporting air, one can change the percentage of certain components of the resulting generated gas, but assuming that the combustion-supporting air is not increased beyond reasonable limits, the oxygen content of the resulting generated gas can be maintained zero. In general an increase in the amount of combustion-supporting air in the combustible mixture serves to increase the contents of carbon dioxide and nitrogen, while decreasing the content of carbon monoxide. By decreasing the amount of combustion-supporting air used in the mixture the carbon monoxide content is increased, while nitrogen and carbon dioxide contents are decreased. Various gases generated by my equipment and method can be used in various industrial applications, as for example for the heat treatment of metals, the envelopment of special electric welding arcs, for conveying finely divided combustible material, etc.

In general it will be apparent that my apparatus makes possible efficient generation of the desired gas, with automatic maintenance of the critical conditions required.

I claim:

In a gas generator, a combustion chamber, a burner head disposed to discharge into the chamber, a heat exchanger in communication with the combustion chamber, an air pump or blower, piping means for supplying hot air to the intake side of the blower, heating means serving to heat the air supplied to the blower, said means being in heat exchange relation with products of combustion being delivered from the combustion chamber to the heat exchanger, a proportional mixing device, piping connecting said mixing device with a source of fuel gas at constant pressure, said piping including a metering orifice, piping also connecting said mixing device with the discharge side of the blower, and means for mixing hot air supplied to the blower with air from the surrounding atmosphere, whereby the temperature of the air supplied by the blower to said mixing device remains constant, said last means including a valve means inserted in the piping connected to the intake of the blower, a connection from said valve means to the atmosphere for introduction of atmospheric air, and a thermostatically operated valve member in said valve means to regulate the proportional intermixing of hot and cool atmospheric air.

References Cited in the file of this patent

UNITED STATES PATENTS

| | | |
|---|---|---|
| 1,313,779 | Bell | Aug. 19, 1919 |
| 1,347,954 | Ionides et al. | July 27, 1920 |
| 1,356,888 | Shea | Oct. 26, 1920 |
| 1,439,103 | Heilman | Dec. 19, 1922 |
| 1,574,107 | Peters | Feb. 23, 1926 |
| 1,958,913 | Decoriolis et al. | May 15, 1934 |
| 2,012,934 | Hardgrove | Aug. 27, 1935 |
| 2,085,584 | Haskell | June 29, 1937 |
| 2,276,690 | Germany | Mar. 17, 1942 |
| 2,571,336 | Buckholdt | Oct. 16, 1951 |